Patented July 20, 1926.

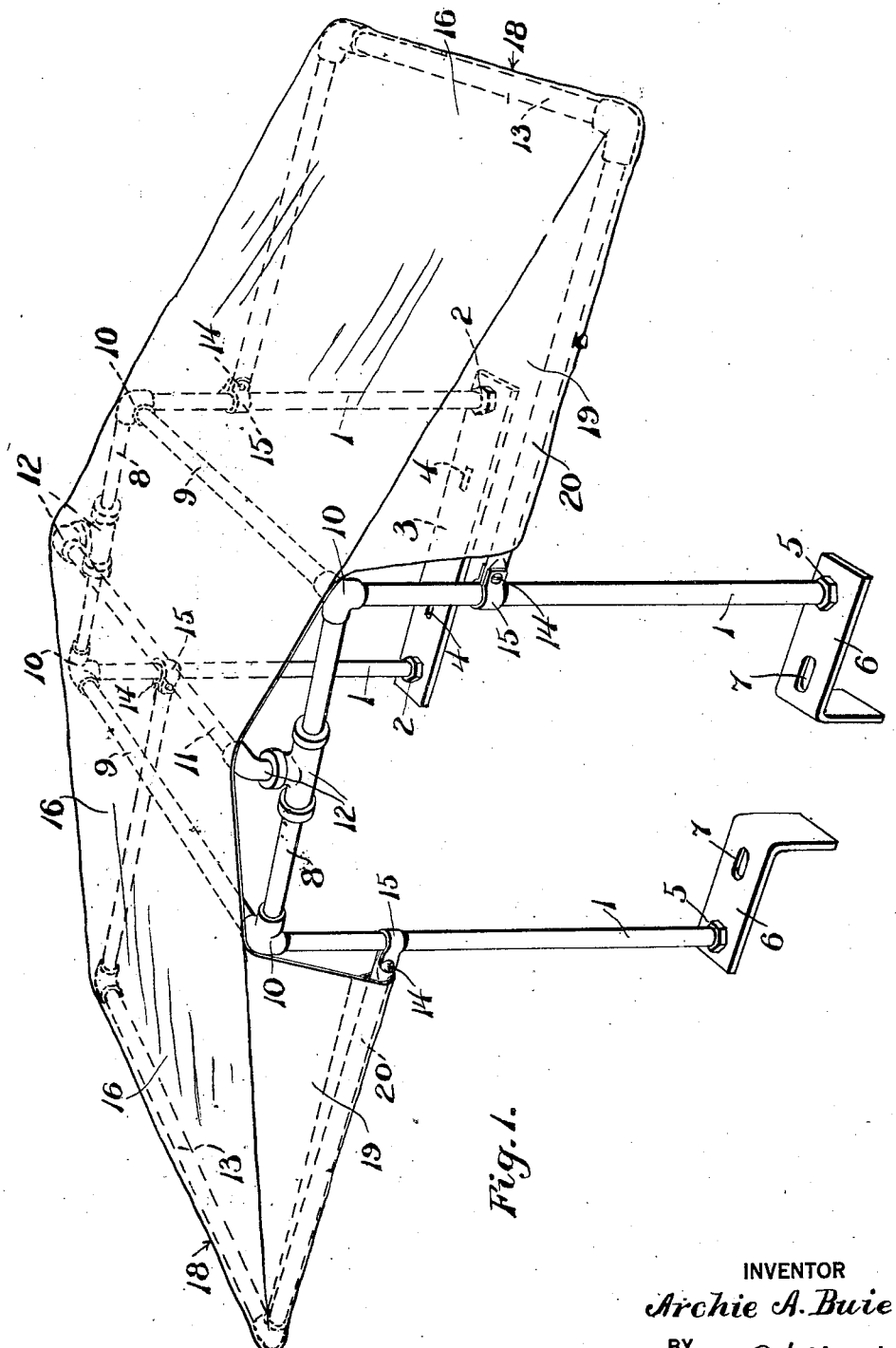

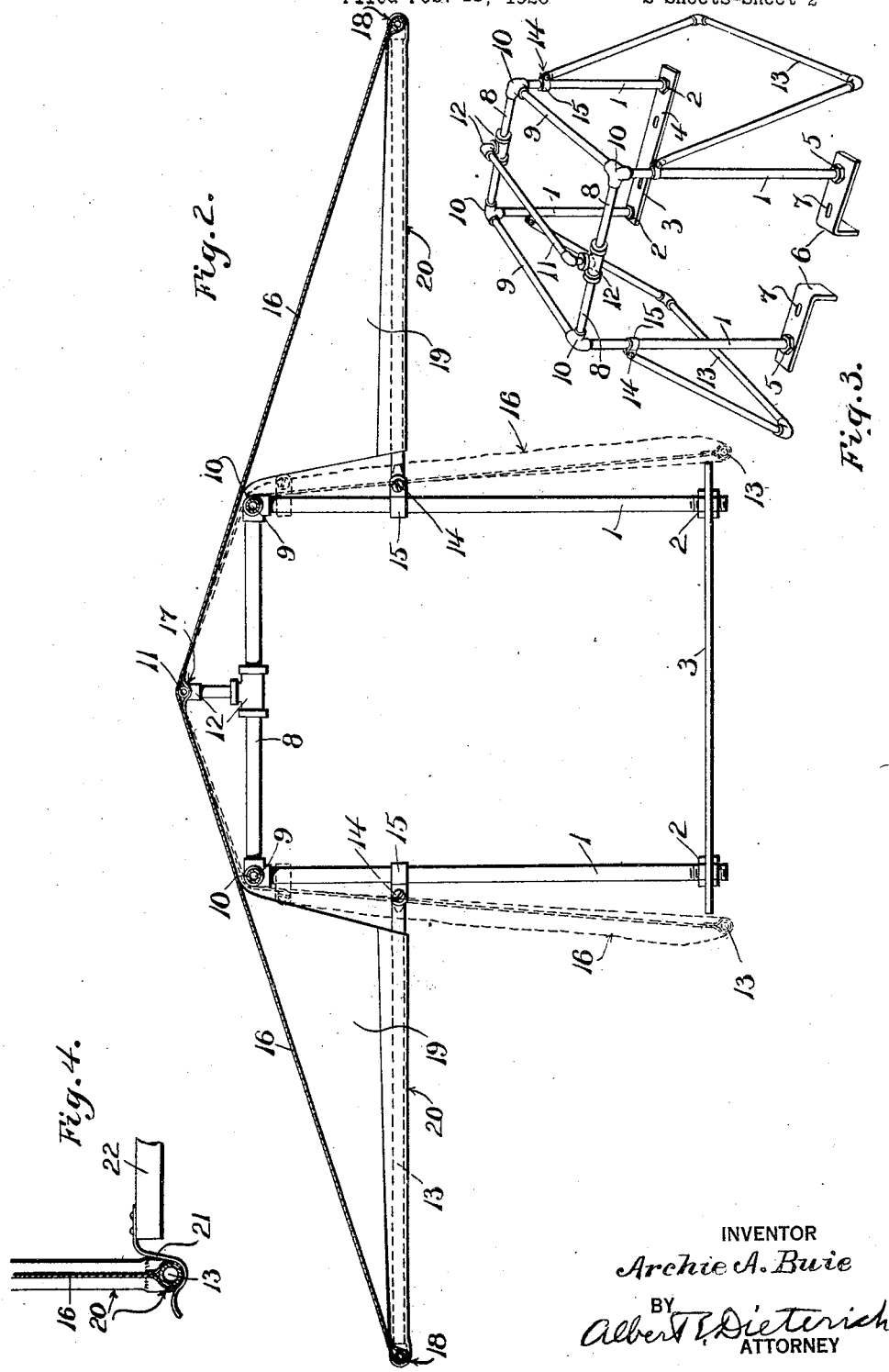

1,593,431

UNITED STATES PATENT OFFICE.

ARCHIBALD A. BUIE, OF MARSHALL, MISSOURI.

SHADE FOR BALERS.

Application filed February 18, 1926. Serial No. 89,114.

The invention generally relates to shade devices for protecting workmen from the sun or for shading ground areas, and particularly has for its object to provide a simple and efficient shade device adaptable for use on hay balers or the like.

In its more detailed nature the invention seeks to provide a shade of the type stated having means for suitably mounting the device upon a baler and extensible side wings so constructed and mounted as to render the same self-supporting when in the extended or elevated position.

With the above and other objects in view that will hereinafter appear, the invention further resides in the novel details of construction, combination and arrangement of parts all of which will be first fully described, then be particularly pointed out in the appended claims, reference being had to the accompanying drawings, in which:

Figure 1 is a perspective view illustrating the invention.

Figure 2 is a vertical cross section of the shade.

Figure 3 is a perspective view of the skeleton framework of the shade.

Figure 4 is a detail cross section illustrating a spring clip for holding the side wings to their collapsed positions.

On carrying out my invention I provide a skeleton framework including collapsible side wings and which is mountable on a hay baler or the like and covered with a shade producing sheeting to provide shade for the men operating thereunder.

The framework includes the corner uprights 1, one end pair of which are secured as at 2 upon the horizontal cross bar 3 which is equipped with suitably positioned slots 4 to accommodate the use of bolts or other securing devices for mounting the frame upon the baler.

The other end pair of uprights are secured as at 5 to the angle plates 6 which are also slot equipped as at 7 to facilitate mounting of the device as above referred to.

While the skeleton framing may be constructed of any suitable material, the use of pipe lengths and the usual union fittings will be found convenient and practical.

An open rectangular top form consisting of the end and side pieces 8 and 9 is secured upon the uprights 1 by the three-way corner unions 10 and upon and centrally above the said top form is secured a longitudinal support rod 11 secured to the end pieces 8 by the fittings 12.

A U-shaped side wing 13 is mounted at each side of the framing each open arm end of each thereof being pivoted at 14 to a sleeve 15 slidable on an upright 1 to thus slidably-pivotally mount the open ends of each said wing.

A shade covering 16 of canvas, or other suitable material, is supported upon the framing and wings and is of a width substantially equivalent to the length of the framing, and of a length sufficient to be secured to the base of one side wing, extend across the same, the top form including the longitudinal support rod, the other side wing, and be secured to the base of the other side wing.

The covering 16 is secured to the longitudinal support rod 11 by a central bead 17 and by end beads 18 to the bases of the wing frames of the opposite sides.

The covering is provided at each end with a pair of laterally projected triangularly shaped extensions 19 which terminate with beads 20 adapted to be secured around the side arms of the U-shaped side wing frames 13.

It will be observed by reference to Figure 2 of the drawings that when the sleeves 15 are at their uppermost positions on the uprights 1, the side wing frames 13 are permitted to hang down vertically against the uprights 1, the covering acting as a means for holding the sleeves and wing frames from sliding downwardly; and the covering of the said wings providing vertical side shade walls.

When it is desired to extend or raise the side wings it is only necessary to lower the sleeves to the limit permitted by the connection of the extensions 19 when, by reason of the relative positions of the wing frame bases, the longitudinal support rod 11, and the sleeves 15, the said sleeves will be caused to bind on the uprights 1 and hold the wings 1 elevated. It will also be observed that when the side wings are raised the cover is pulled taut, in a straight line from the central support rod 11 thereby relieving intermediate contact of the covering and, by reason of the central bead connection 17, equalizing the positions of the side wings.

When it is desired to lower the side wings it is only necessary to force the sleeves 15 upwardly to their uppermost position, permitting the side wings to drop to their pendent position.

A spring clip 21 may be employed to receive the base of each side wing to hold said wings from swinging when in the lowered position. The clips may be secured upon any suitable fixed support indicated generally at 22 and which may be a suitable part of the baler.

From the foregoing description, taken in connection with the accompanying drawings, it is thought that the novel details of construction, the manner of use and the advantages of the invention will be readily apparent to those skilled in the art to which it appertains.

What I claim is:—

1. A device of the class described comprising a skeleton framing including corner uprights and a rectangular top framing portion, U-shaped side wing frames having their arm ends slidably pivoted to the uprights, and a shading sheet secured at its ends to the U-frame bases and extended over the top framing portion, whereby when the slidably pivoted ends are moved downwardly the side wing frames will be extended to extend the shade sheet ends and when moved upwardly they will permit the said frames to lower to move the shade sheet ends to position for forming side walls.

2. A device of the class described comprising a skeleton framing including corner uprights and a rectangular top framing portion, a longitudinal support rod secured centrally longitudinally of and slightly above the top framing portion, U-shaped side wing frames having their arm ends slidably pivoted to the uprights, and a shading sheet secured centrally to the longitudinal support rod and at its ends to the U-frame bases, whereby when the slidably pivoted ends are moved downwardly the side wing frames will be extended to extend the shade sheet tautly from the center connection thereof to the ends and when moved upwardly they will permit the said frames to lower to move the shade sheet ends to position for forming side walls.

3. A device of the class described comprising a skeleton framing including corner uprights and a rectangular top framing portion, U-shaped side wing frames having their arm ends slidably pivoted to the uprights, and a shading sheet secured at its ends to the U-frame bases and extended over the top framing portion, whereby when the slidably pivoted ends are moved downwardly the side wing frames will be extended to extend the shade sheet ends and when moved upwardly they will permit the said frames to lower to move the shade sheet ends to position for forming side walls, and triangular pieces extended from the shade sheet and secured to the side arms of the wing frames to limit the downward movement of the slidable pivoted connections and to provide lateral shade areas.

4. A device of the class described comprising a skeleton framing including corner uprights and a rectangular top framing portion, a longitudinal support rod secured centrally longitudinally of and slightly above the top framing portion, U-shaped side wing frames having their arm ends slidably pivoted to the uprights, and a shading sheet secured centrally to the longitudinal support rod and at its ends to the U-frame bases, whereby when the slidably pivoted ends are moved downwardly the side wing frames will be extended to extend the shade sheet tautly from the center connection thereof in the ends and when moved upwardly they will permit the said frames to lower to move the shade sheet ends to position for forming side walls, and triangular pieces extended from the shade sheet and secured to the side arms of the wing frames to limit the downward movement of the slidable pivoted connections and to provide lateral shade areas.

5. A device of the class described comprising a skeleton framing including corner uprights and a rectangular top framing portion, U-shaped side wing frames having their arm ends slidably pivoted to the uprights, and a shading sheet secured at its ends to the U-frame bases and extended over the top framing portion, whereby when the slidably pivoted ends are moved downwardly the side wing frames will be extended to extend the shade sheet ends and when moved upwardly they will permit the said frames to lower to move the shade sheet ends to position for forming side walls, and spring clips mountable upon a fixed support and adapted for engaging the wing frames when lowered to hold them to their lowered positions.

ARCHIBALD A. BUIE.